US007246352B2

(12) United States Patent
Jain et al.

(10) Patent No.: US 7,246,352 B2
(45) Date of Patent: Jul. 17, 2007

(54) SYSTEM FOR GENERATING A VIRTUAL MAP TO A PLURALITY OF FILES NECESSARY FOR INSTALLING SOFTWARE FROM MULTIPLE NETWORKED LOCATIONS

(75) Inventors: Mohit Jain, Durham, NC (US); Dennis E. Myers, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 10/202,507

(22) Filed: Jul. 24, 2002

(65) Prior Publication Data

US 2004/0019888 A1    Jan. 29, 2004

(51) Int. Cl.
     *G06F 9/445*      (2006.01)
(52) U.S. Cl. .................................................. 717/176
(58) Field of Classification Search ............... 709/201, 709/221, 226; 717/168–173, 174–178; 395/700
See application file for complete search history.

(56) References Cited

U.S. PATENT DOCUMENTS

| 5,142,680 | A | * | 8/1992 | Ottman et al. ............... 395/700 |
| 5,247,683 | A | * | 9/1993 | Holmes et al. .............. 709/221 |
| 5,652,746 | A | | 7/1997 | Heiman ....................... 369/124 |
| 5,675,780 | A | | 10/1997 | Plant-Mason et al. ...... 395/606 |
| 5,732,265 | A | | 3/1998 | Dewitt et al. ............... 395/616 |
| 5,832,520 | A | | 11/1998 | Miller ......................... 707/203 |
| 6,023,586 | A | * | 2/2000 | Gaisford et al. ............ 717/178 |
| 6,079,047 | A | | 6/2000 | Cotugno et al. ............ 714/807 |
| 6,151,643 | A | * | 11/2000 | Cheng et al. ................ 710/36 |
| 6,202,207 | B1 | * | 3/2001 | Donohue ..................... 717/173 |
| 6,324,691 | B1 | * | 11/2001 | Gazdik ........................ 717/178 |
| 6,389,433 | B1 | * | 5/2002 | Bolosky et al. ............. 707/205 |
| 6,457,170 | B1 | * | 9/2002 | Boehm et al. .............. 717/106 |
| 6,557,054 | B2 | * | 4/2003 | Reisman ....................... 710/33 |
| 6,564,369 | B1 | * | 5/2003 | Hove et al. ................. 717/121 |
| 6,802,061 | B1 | * | 10/2004 | Parthasarathy et al. ..... 717/173 |
| 6,859,924 | B1 | * | 2/2005 | Kroening .................... 717/173 |
| 2002/0055939 | A1 | * | 5/2002 | Nardone et al. ............ 707/104 |
| 2002/0133814 | A1 | * | 9/2002 | Bourke-Dunphy et al. . 717/174 |
| 2003/0018964 | A1 | * | 1/2003 | Fox et al. .................... 717/177 |
| 2003/0236927 | A1 | * | 12/2003 | Cleraux et al. ............. 709/331 |

FOREIGN PATENT DOCUMENTS

EP     1096374 A2 * 2/2001

OTHER PUBLICATIONS

"Anticipated Mounting of Compact Disk-Read Only Memory Disks based on Selected Application-Icons" IBM Technical Disclosure Bulletin; vol. 39, No. 03; Mar. 1996.

* cited by examiner

*Primary Examiner*—Meng-Al T. An
*Assistant Examiner*—Trenton J. Roche
(74) *Attorney, Agent, or Firm*—Bockhop & Associates

(57) ABSTRACT

In a method of generating a virtual map to a plurality of data files necessary for installing software on a computer that is coupled to a network, a primary directory that includes a plurality of links is generated. Each link points to a subdirectory that lists at least one file that is necessary for installing the software. Any subdirectories pointed to by any of the of links that contain redundant files are detected and any links pointing to redundant files are removed from the primary directory. All conflicts between files pointed to by any links of the plurality of links are detected and listed in a conflict report.

7 Claims, 2 Drawing Sheets

SYSTEM FOR GENERATING A VIRTUAL MAP TO A PLURALITY OF FILES NECESSARY FOR INSTALLING SOFTWARE FROM MULTIPLE NETWORKED LOCATIONS

BACKGROUND OF THE INVENTION

1. Field of the Invention

The present invention relates to computer systems and, more specifically, to a system for installing software from multiple networked locations.

2. Description of the Prior Art

Installation of software onto a computer typically involves loading a compact disk (CD) in the computer and running an install routine. As shown in FIG. 1, an installation program 14 is run on a client system 12 to install the software. When the software data files necessary for the installation are so large as to exceed the capacity of a single CD, the installation typically involves sequentially loading a plurality of CDs 16 by an operator to complete the install.

When installing software packages on large computer systems, depending on the type of installation chosen, the install can take several hours to complete. The reason for such a long installation period is partly because the installing technician is frequently interrupted during the install. For example, the technician may be called away for meetings, lunch and other ongoing projects and, therefore, may not always be nearby to switch CDs for the installation. Because of this, an installation may take two to four hours longer than if the process were automatic.

Another problem associated with major installations is that they require the physical presence of the technician to change the CDs within the time frame of the installation. This makes it difficult, for example, to start installations in the evening and then allow the installation to run overnight. Also, complicated installations may require data files from several different sources, requiring an operator to seek out the various sources of installation data.

Therefore, there is a need for system that allows a networked computer to receive installation files via a network so as to be able to perform an unattended software install.

SUMMARY OF THE INVENTION

The disadvantages of the prior art are overcome by the present invention which, in one aspect, is a method of generating a virtual map to a plurality of data files necessary for installing software on a computer that is coupled to a network. A primary directory that includes a plurality of links is generated. Each link points to a subdirectory that lists at least one file that is necessary for installing the software. At least a first subdirectory is pointed to by a first link to a first source location that is coupled to the network and at least a second subdirectory is pointed by a second link to a second source location that is coupled to the network. Any subdirectories pointed to by any of the plurality of links that contain redundant files are detected and any links pointing to redundant files are removed from the primary directory. All conflicts between files pointed to by any links of the plurality of links are detected and listed in a conflict report. The links listed in the conflict report are removed from the primary directory, which results in the virtual map.

In another aspect, a list is built of a plurality of source locations from which a plurality of data files necessary for the install reside, wherein each source location is coupled to the network. A plurality of source subdirectories and file information is obtained from the source locations. Each of the subdirectories includes at least one link to a source location of the plurality of source locations. The source subdirectories are consolidated into a single primary directory. Any non-unique subdirectories are filtered out from the primary directory. Any unnecessary links are also filtered from the primary directory. Conflicting subdirectories in the primary directory are detected and a list of conflicting subdirectories is generated. Any conflicting subdirectories in the primary directory are deleted, which results in the virtual map.

In yet another aspect, the invention is an apparatus for installing software. A primary directory, stored on a computer-readable memory. The primary directory includes a plurality of links, each link pointing to a subdirectory that lists at least one file that is necessary for installing the software. At least a first subdirectory is pointed to by a first link to a first location that is coupled to the network and at least a second subdirectory is pointed by a second link to a second location that is coupled to the network.

In yet another aspect, the invention is a data structure that may be employed by a computer that is in data communication with a computer network to retrieve a plurality of data files necessary to install a software module on the computer. A virtual map points to a plurality of source subdirectories from a corresponding plurality of source locations from which a plurality of data files necessary for the install reside, each of the source subdirectories including at least one link to a source location.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
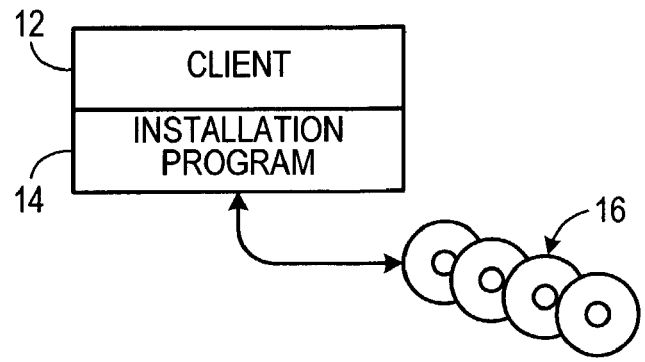
FIG. 1 is a block diagram of a prior art system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a,""an," and "the" includes plural reference, the meaning of "in" includes "in" and "on." Also, as used herein, "global computer network" includes the Internet.

Figure 2:
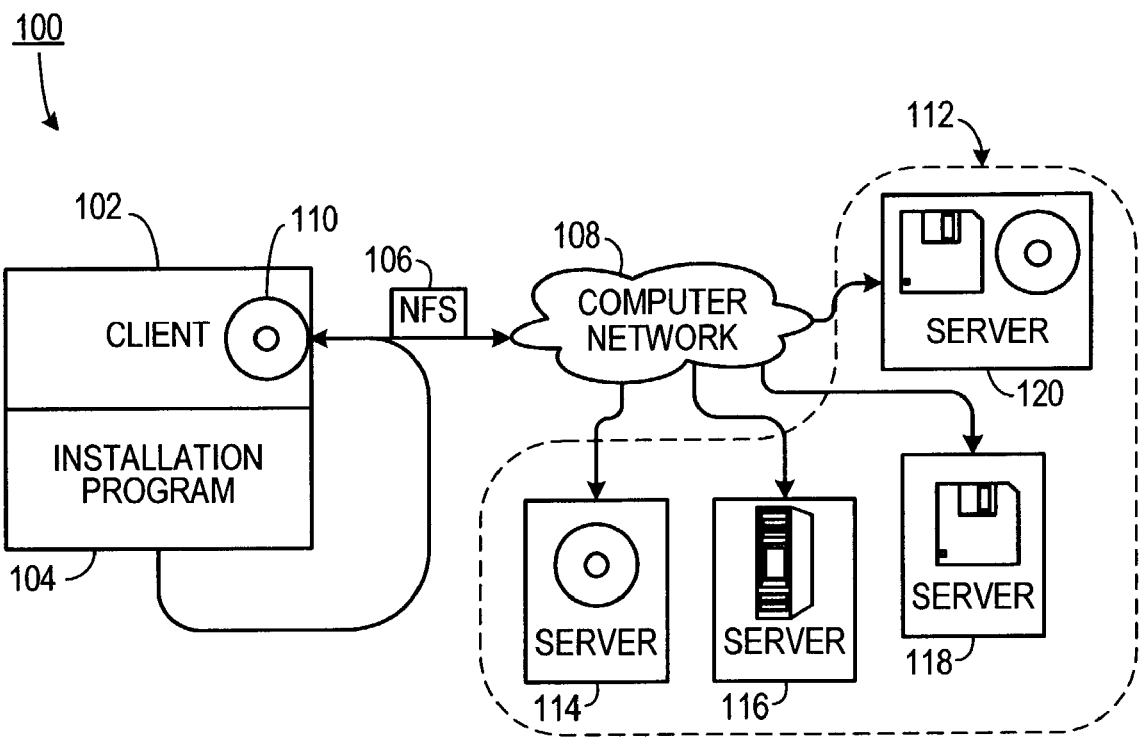
FIG. 2 is a block diagram of a system according to the invention.

One illustrative embodiment 100 of the invention, as shown in FIG. 2, is used to install software onto a client system 102, such as a computer. The client system 102 employs a file system 106 that allows CD images to be mounted on a server as a directory, such as NFS, available on most UNIX systems. The client system 102 is in data communication with a computer network 108, which could include, for example, a global computer network. The computer network 108 is in data communication with one or more servers 112.

An installation program 104 is started on the client system 102 through one of several means generally known to the art of software installation. For example, the installation program 104 could be started by loading a CD 110 in the client system 102, or it could be embedded in the client system 102 and initiated by an operator command.

The installation program 104 includes a directory structure that maps all files necessary for the installation into a primary directory. The primary directory points to each of the servers 112. Any data format can be used to store the installation data files. For example, some of the data files could reside on a dedicated CD server 114, server 116 that stores data files on a hard drive, a floppy disk server 118, or even a hybrid server 120 that stores data files in several different formats, including volatile memory.

Figure 3:
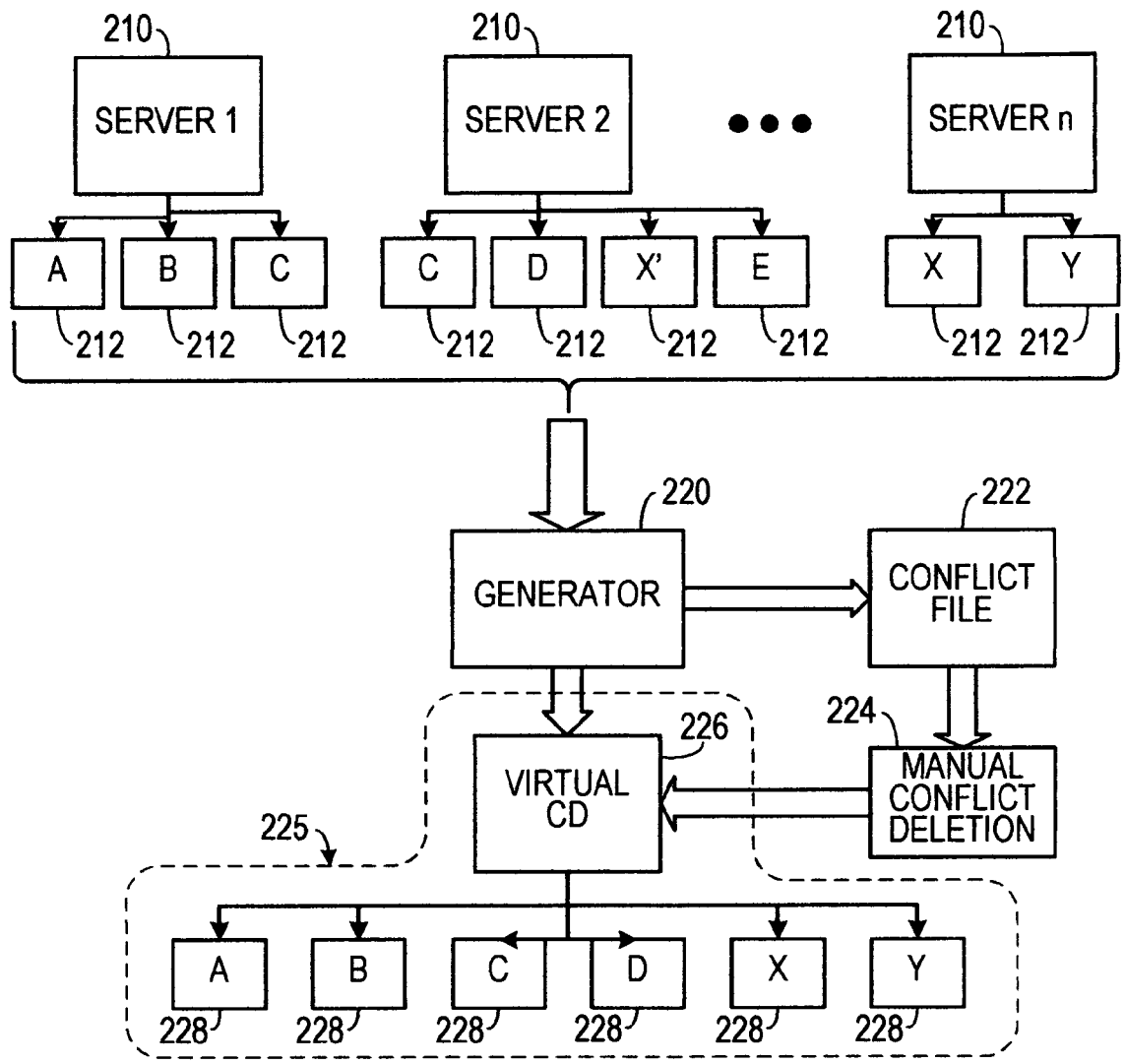
FIG. 3 is a block diagram showing the process of generating a virtual map.

As shown in FIG. 3, one embodiment of the invention creates a directory structure 225 from a plurality of data sources 212 stored on one or more subdirectories that are stored on one or more servers. The generating program 220 creates a map that points to each of the necessary data sources 212. (The information necessary to create the map is generally compiled by a developer prior to the installation software being released.) The generating program 220 will look for any redundancies and remove pointers to redundant files. The generating program 220 will also look for conflicting programs, such as different versions of the same module, and generate a conflict report 222 that lists all of the conflicts. The developer will then manually resolve any conflicts 224 by deleting any pointers to undesired files listed in the conflict report 222. What is left is virtual map 226 to all of the data files 228 necessary to perform an install of the software. The directory structure 225 may be stored on a CD, or it may be stored on any other computer-readable storage medium known to the art, such as a magnetic storage medium.

In the example provided, the servers 210 store the following data files 212: A, B, C (on Server 1); C, D, X', E (on Server 2); and X, Y (on Server n). The files necessary for the install include: A, B, C, D, X and Y. The generating program 220 initially creates a virtual map to files A, B, C on Server 1; files C, D, X' on Server 2, and to files X, Y on Server n. The generating program 220 ignores file E on Server 2, as it is not necessary for the install. The generating program 220 first detects the redundancy between file C on Server 1 and file C on Server 2 and selects only one of the copies of file C (for example the copy on Server 1). The generating program 220 next detects that Server 2 has a copy of file X (shown as X') that is different from the copy of file X on Server n, and lists both files on the conflict report 222. A developer then determines which copy of file X is the proper file based on various criteria (e.g., the criteria could include which copy is the most recent) and deletes the link in the primary directory structure 225 to the undesired file (X', in the example shown)

The virtual map 226 is essentially a "virtual CD" made from any given number of data sources. This virtual CD embodies all of the necessary files and directories that are given on a set of installation data sources. By making use of a file system that allows data source images to be mounted on a server as a directory, the invention analyzes all of the data source images that are mounted and that represent the physical data source sets. The invention then determines the uniqueness of each of the directories and files, and creates a merged set of all of these files and directories. The invention then generates a single directory that appears to the client system 102 to be the entire set of data sources. This allows an installation to point to this directory structure instead of using the individual data sources. By doing this, the installation will not ask for the next CD because it will find what it is looking for in this "virtual CD" and therefore not prompt the user for any other CDs.

Copying a large number of CDs, or other installation data sources, to a workstation is not practical. However, with the already existing NFS file system, the data sources can be spread out throughout a networked environment. The invention takes advantage of this and consolidates all of these locations into one place so the end-user will not have to point to those locations manually. The invention also determines if there are any possible conflicts which would prevent a product set from using this installation method by reporting any conflicts across the span of data sources.

The invention relieves the user from having to determine the differences between the files and directories on a set of CDs manually; and relieves the user from having to switch between CDs to accomplish a product installation. The invention works on the assumption that a product installation program that uses CDs (or other large media storage) looks for a particular file or directory structure on the installation CD. If the installation program finds what it needs, it continues. Using that premise, the invention takes advantage of this by "tricking" the installation into thinking it is running against the same media, even though it is looking at the sum of all the media which may be in the linked network. This gives the developer the flexibility to use a dedicated server or a farm of servers to keep each CD of the product set, thereby reducing storage concerns.

One example of a generator system 220 employs the following steps:
1. Loading property/configuration settings (this points to all necessary locations);
2. Building a list of locations;
3. Obtaining all directory & file information from there source;
4. Processing all directory & file for formatting;
5. Consolidating all directory structures;
6. Filtering out non-unique subdirectories;
7. Filtering unnecessary links & determines conflicting directories;
8. Consolidating all file structures;
9. Removing duplicate file entries;
10. Validating links & conflicting files;
11. Removing duplicates from conflicting files;
12. Removing conflicting files from the main list;
13. Removing excess processed files;
14. Determining source of all validated links;
15. Determining source of all conflicts & generates a report; and
16. Building the "virtual CD" based on the results.

The generator 220 may make use of a hash table to eliminate excessive search times and may use file size as the uniqueness indicator to detect file conflicts. The system can make use of the link pointer on UNIX systems to avoid having to copy files locally. The system may also employ an exclude feature to allow users to bypass conflicts once they are determined (e.g., multiple readme.txt files across several CDs). The system may also employ a post-op feature to allow users to run related post-operational procedures to rectify any potential conflicts on the "virtual CD."

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method, operable on a computer, of generating a virtual map to a plurality of data files necessary for installing software on the computer that is coupled to a network, comprising the steps of:
    a. generating a primary directory that includes a plurality of links, each link pointing to a subdirectory that lists at least one file that is necessary for installing a software product installation, at least a first subdirectory pointed to by a first link to a first source location that is coupled to the network and at least a second subdirectory pointed to by a second link to a second source location, different from the first source location, that is coupled to the network;
    b. determining if any subdirectories pointed to by any of the plurality of links contain redundant files and removing from the primary directory any links pointing to redundant files;
    c. determining all conflicts between files pointed to by any links of the plurality of links and generating a conflict report identifying all conflicts; and
    d. storing the primary directory on a computer-readable medium to form the virtual map.

2. The method of claim 1, further comprising the step of removing links listed in the conflict report from the primary directory so as to form the virtual map.

3. The method of claim 1, further comprising the step of manually deleting any conflicting subdirectories listed on the conflict report.

4. The method of claim 1, further comprising the step of recording the directory on a compact disk.

5. The method of claim 1, further comprising the step of recording the directory on a magnetic storage medium.

6. A method, operable on a computer, of generating a virtual map to a plurality of data files necessary for installing a software product on a second computer that is coupled to a network, comprising the steps of:
    a. building a list of a plurality of source locations from which a plurality of data files necessary for a software product install reside, each source location being coupled to the network;
    b. obtaining a plurality of source subdirectories and file information from the source locations, each of the subdirectories including at least one link to a source location of the plurality of source locations;
    c. consolidating the source subdirectories into a single primary directory;
    d. filtering out any non-unique subdirectories from the primary directory;
    e. filtering any unnecessary links from the primary directory;
    f. detecting conflicting subdirectories in the primary directory and generating a list of conflicting subdirectories;
    g. deleting any conflicting subdirectories in the primary directory, thereby forming the virtual map; and
    h. storing the virtual map on a computer-readable medium to form the virtual map.

7. A computer program, stored on a computer-readable medium and executable by a computer, for installing software onto a client system in data communication with a computer network, comprising:
    a. programming for generating a primary directory that includes a plurality of links, each link pointing to a subdirectory that lists at least one file that is necessary for installing a software product, at least a first subdirectory pointed to by a first link to a first source location that is coupled to the network and at least a second subdirectory pointed to by a second link to a second source location, different from the first source location, that is coupled to the network;
    b. programming for determining if any subdirectories pointed to by any of the plurality of links contain redundant files and removing from the primary directory any links pointing to redundant files;
    c. programming for determining all conflicts between files pointed to by any links of the plurality of links and generating a conflict report identifying all conflicts; and
    d. programming for facilitating manual removal of links listed in the conflict report from the primary directory so as to form the virtual map.

* * * * *